(No Model.) 2 Sheets—Sheet 1.

E. PATTEN.
MECHANICAL MOVEMENT.

No. 502,828. Patented Aug. 8, 1893.

WITNESSES.
Robert Wallace.
A. H. Morrison.

INVENTOR:
Enos Patten
By Macleod Calver & Randall
Attorneys (No Model.) 2 Sheets—Sheet 2.

E. PATTEN.
MECHANICAL MOVEMENT.

No. 502,828. Patented Aug. 8, 1893.

WITNESSES.
Robert Wallace.
A. H. Morrison.

INVENTOR.
Enos Patten
By Macleod Calver & Randall
Attorneys

UNITED STATES PATENT OFFICE.

ENOS PATTEN, OF LYNN, MASSACHUSETTS, ASSIGNOR TO AUGUSTUS J. HOYT, TRUSTEE, OF SAME PLACE.

MECHANICAL MOVEMENT.

SPECIFICATION forming part of Letters Patent No. 502,828, dated August 8, 1893.

Application filed May 28, 1892. Serial No. 434,705. (No model.)

*To all whom it may concern:*

Be it known that I, ENOS PATTEN, a citizen of the United States, residing at Lynn, in the county of Essex and State of Massachusetts, have invented certain new and useful Improvements in Mechanism, of which the following is a specification, reference being had therein to the accompanying drawings.

My invention has for its object to provide mechanism whereby a table or support upon which may be mounted devices of various kinds designed to operate upon irregular objects may be moved so as to present said devices to each part of the irregular surface of the object to be acted upon and it consists in a mechanism the parts of which are constructed, combined and arranged as hereinafter set forth and the novel features of which are pointed out in the claims which are appended hereto and made a part hereof.

Figure 1:
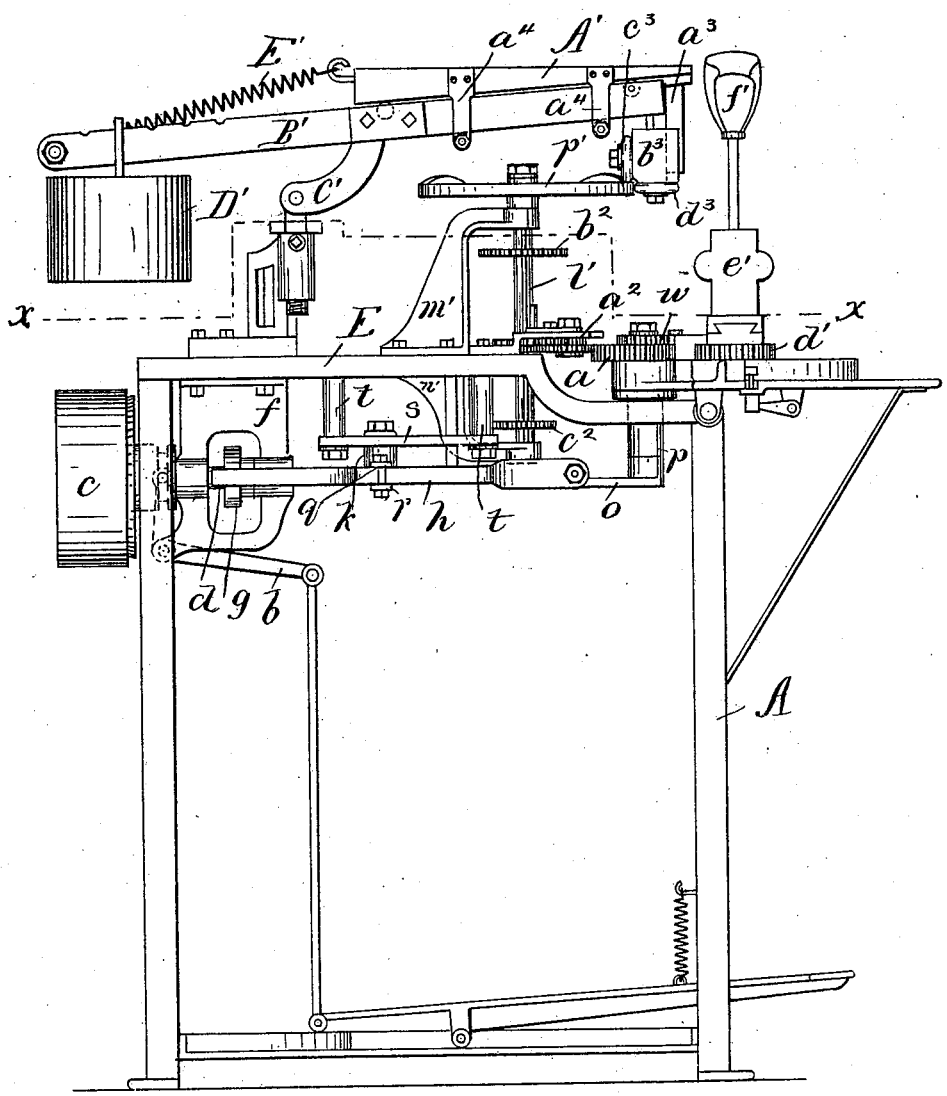
Figure 2:
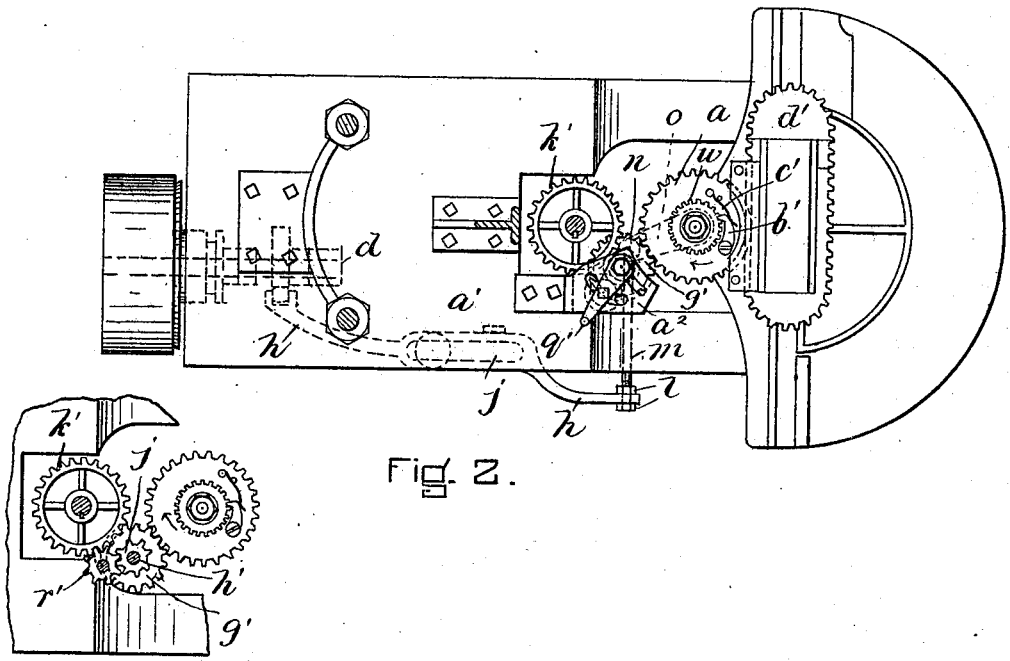
Figure 5:
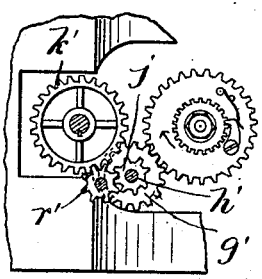
Figures 3, 4:
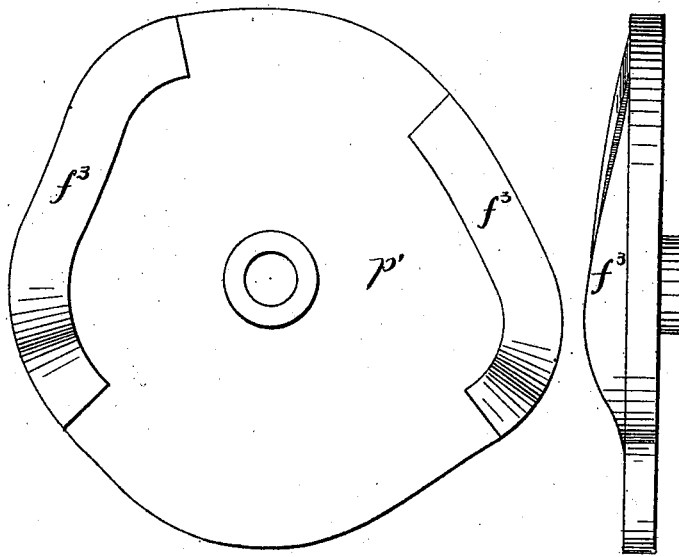

In the accompanying drawings which illustrate my invention and which are referred to in the following description, Figure 1 is a side elevation of mechanism embodying my invention. Fig. 2 is a plan view looking down from line $x-x$ Fig. 1. Fig. 3 is a plan and Fig. 4 a side view of the "form" hereinafter referred to. Fig. 5 is a detail hereinafter referred to.

My mechanism is intended to be applied in various connections where it is requisite that a table or support such as is above referred to, or the like part of a machine, should have movements of the character above noted. For convenience and readiness of illustration I have shown an embodiment of the said mechanism in lasting machines, which is one of the applications thereof that I have contemplated making.

The mechanism may be mounted upon any suitable frame. Such a frame is indicated at A. Suitably supported in the lower portion of the frame A, I have shown a treadle which is connected by means of a connecting rod with a shipper lever $b$ by means of which a clutch mechanism is operated to stop or start the machine, all these parts being of common construction. The belt pulley is shown at $c$ and the driving shaft at $d$. The driving shaft is mounted in suitable bearings in a hanger or downward projection $f$ secured to the under side of the table E. On the driving shaft $d$ is secured an eccentric or cam wheel $g$ which operates the lever $h$, said lever being provided with a cam roll which engages with the periphery of said cam $g$ as shown in Fig. 2. The spring $a'$ secured to the table E engages the lever and serves to hold the cam roll in contact with the cam $g$. The lever $h$ is provided with a longitudinal slot as shown at $j$, Fig. 2, to permit of changing its fulcrum and thus of increasing or diminishing its throw. Said lever is secured by means of a bolt $k$, the central portion of which is of larger diameter than the end portions. The lower end of the bolt $k$ passes through the slot $j$ and is provided with a cross piece $q$ which lies on top of the lever $h$ and is bolted on either side of the lever to a cross piece $r$ on the under side of the lever. The upper portion of the bolt $k$ passes through a longitudinal slot in the cross piece $s$ which is rigidly secured to the studs $t$ which project downwardly from the under side of the table. It will be clear that by shifting the position of the bolt $k$ the throw of the lever $h$ may be increased or diminished. The other end of said lever $h$ is provided with a rod $m$ which passes through the end thereof and is secured by nuts $l$ Fig. 2. The rod $m$ is secured by means of a pivotal connection shown at $n$ to a crank-arm $o$ which is set on the lower end of a vertical shaft $p$ which is mounted in a suitable bearing in the table E. To the upper end of the shaft $p$ is rigidly secured a ratchet $w$ and below the ratchet on the said shaft is mounted a gear $a$. On the upper face of the gear $a$ is secured a pawl $b'$ which engages the teeth of the ratchet $w$, the pawl being held in engagement with said teeth by means of a spring $c'$. As the crank-arm $o$ is moved in one direction the pawl $b'$ slips over the teeth of the ratchet $w$, the gear $a$ being stationary, but as the crank arm moves in the opposite direction the gear $a$ will be partially rotated. The gear $a$ is in mesh with an oblong gear $d'$. The oblong gear is so mounted that it will travel in a right line while its side is in mesh with the gear $a$ and will then describe a half circle while the end is in mesh with the said gear after which it will move in a right line until it reaches the other end of its movement and will swing through another half circle thus completing one rotation.

A more detailed description of the construction and operation of the oblong gear, I deem unnecessary as such gears are well-known.

An oblong gear of improved construction is shown, described and claimed in an application for Letters Patent filed by me November 17, 1891, Serial No. 412,149. The irregular object which is to be subjected to the action of the devices mounted upon the table as hereinafter set forth, is mounted in a suitable frame which is placed upon this gear.

In the drawings, Fig. 1, I have shown a block $e'$ which is dove-tailed on a projection or base which is rigidly secured to the oblong gear. On the block $e'$ is shown a last $f'$ mounted on a suitable support. As a last is of irregular shape such a mechanism is particularly adapted to carry devices for performing various operations in connection with the lasting of shoes, the rounding out of soles, and the like. It will be noted that as the oblong gear revolves, the sides and ends of the last will be presented to the movable table of the machine and consequently to any devices which may be mounted thereon.

For the purpose of moving the table of the machine, I provide a gear $g'$ which is in mesh with the gear $a$ and which is mounted on a movable arbor or shaft $h'$. Above the gear and rigidly secured thereto is a pinion $j'$, see Fig. 5 which when the gear $g'$ is in one position is in mesh with the gear $k'$ which is fast on the vertical shaft $l'$. The shaft $l'$ is mounted in suitable bearings in a vertical frame $m'$ $n'$ above and below the table E and carries at its upper end the form $p'$. As the gear $a$ is revolved it will be clear that the shaft $l'$ and form $p'$ will also be caused to revolve. The arbor or shaft $h'$ of the gear $g'$ is provided with an arm $q'$ in which is mounted a short shaft which carries the pinion $r'$ which is in mesh with the pinion $j'$ which latter is mounted on said movable shaft $h'$ on which the gear $g'$ is mounted as previously stated. The arbors of the pinions $j'$ $r'$ are made to slide in slots in the support $a^2$ which projects from and is secured to the table E as shown in Fig. 1. When by means of the lever arm $q'$ the said arbors are shifted from the position shown in Fig. 2 to that shown in Fig. 5 the pinion $r'$ is thrown into mesh with the gear $k'$ and by thus introducing another intermediate gear or pinion the movement of the gear $k'$ is reversed, thus reversing the movement of the form $p'$. By this arrangement of gears the movement of the form $p'$ may be quickly and easily reversed, and thus the movement of the table A' may be changed. This is important in operating upon objects which are the opposites of each other in certain parts of their outline as for example, right and left shoes. Were it not for this construction of the gears, the form $p'$ would require to be changed in adapting the machine to operate upon a left instead of a right shoe. The shaft $l'$ which carries the form $p'$ may be provided with one or more extra gears as shown at $b^2$ $c^2$ Fig. 1. These gears are splined on the shaft and may be moved into the operative position occupied by gear $k'$ Figs. 2 and 5, in case it should be desired to increase or diminish the speed of the shaft $l'$. What I have termed the form $p'$ is a combined face and periphery cam and it may be of any shape desired to give the proper movement to the table A'. The table A' is mounted on a frame B' which is provided with a curved arm C' which is pivoted to an upright from the table E. The frame B' is preferably provided with a counter balance as shown at D' so that it may be readily moved on its pivot. On the forward end of the frame B' is a sliding table A' which is drawn backward by a spring E', said table being arranged to slide on the frame B' on suitable anti-friction rolls. Downwardly projecting side pieces $a^4$ secured to the sides of the table see Fig. 1 are provided at the lower ends with rolls which bear on the under edges of the frame pieces B' and prevent the table from being raised relatively to said frame B'. At the forward end of the table A' is a downward projection $a^3$ to the lower end of which is secured an adjustable block $b^3$. On the face of the block $b^3$ is a roll $c^3$ and on the under side of the said block $b^3$ is another roll $d^3$. These rolls bear on the face and periphery respectively of the form $p'$. Since the spring E' tends to draw the table A' rearwardly, it holds the roll $d^3$ constantly in contact with the periphery of the form $p'$. The face of the form $p'$ is provided with projections as shown at $f^3$ Figs. 3 and 4, which are placed in the path of the roll $c^3$. It will be clear that as the form $p'$ revolves carrying the projections $f^3$ under the roll $c^3$ the table A' will be raised and lowered in a manner corresponding to the shape of the projections $f^3$ and it will further be obvious that the table A' will be moved forward and backward in accordance with the shape of the periphery of the form $p'$. By this means any vertical or horizontal movement may be given to the table A' and its movement may be accurately timed to correspond with the movement of the irregular form which is carried on the oblong gear $d'$.

What I claim is—

1. The combination with the form $p'$ and suitable actuating mechanism therefor of the pivoted frame B' and the sliding table A' mounted on said frame, substantially as set forth.

2. The combination with the pivoted frame B' having a sliding table mounted thereon of the form $p'$, the oblong gear $d'$ and actuating mechanism intermediate the said form and the oblong gear whereby both are operated from the same shaft, for the purposes and substantially as set forth.

3. The combination with the form $p'$ and its shaft, the movable table operated by said form and the oblong gear $d'$, of a gear $a$ which engages said oblong gear, a pawl and ratchet for operating said gear $a$, the lever $h$, and its actuating cam for operating said ratchet, and connecting gears intermediate the said gear $a$, and the shaft of the form $p'$, substantially as shown and described.

4. The combination with the form $p'$ and its shaft $l'$ of the gear $d'$, a train of connecting gears intermediate the said shaft $l'$ and the gear $d'$, a pawl and ratchet mechanism for operating said gears, an actuating lever and its cam for said ratchet, said actuating lever having a movable fulcrum whereby its throw may be increased or diminished, substantially as described.

5. The combination with the form $p'$ and its actuating shaft, of the gear $k'$, on said shaft, the gear $a$, its operating pawl, ratchet and lever, intermediate gears having movable arbors whereby by moving the arbors one gear may be thrown into or out of the train and the movement of the form reversed, substantially as set forth.

6. The combination with the form $p'$ and suitable actuating mechanism therefor, of the counter-balanced pivoted frame $B'$ and suitable connections intermediate the frame and the said form $p'$, whereby the frame $B'$ may be moved vertically as the form $p'$ revolves, substantially as set forth.

7. The combination with the form $p'$ and suitable actuating mechanism therefor of the counter-balanced, pivoted frame $B'$, a sliding table $A'$ mounted thereon, and suitable connecting means intermediate the said table and the said form whereby the table will be moved horizontally as the form revolves, substantially as set forth.

8. The combination with the form $p'$ and its actuating mechanism of the pivoted frame $B'$ the sliding table $A'$ mounted thereon, the spring $E'$ the projection $a^3$ on said table and cam rolls $c^3$ $d^3$ engaging the face and periphery of said form $p'$ substantially as shown and described.

In testimony whereof I affix my signature in presence of two witnesses.

ENOS PATTEN.

Witnesses:
WM. A. MACLEOD,
ROBERT WALLACE.